US011914024B2

(12) United States Patent
Han et al.

(10) Patent No.: US 11,914,024 B2
(45) Date of Patent: Feb. 27, 2024

(54) SYSTEMS, METHODS, AND DEVICES FOR DRONE DETECTION USING AN OUTDOOR LIGHTING NETWORK

(71) Applicant: SIGNIFY HOLDING B.V., Eindhoven (NL)

(72) Inventors: Dong Han, Newton, MA (US); Jia Hu, Brookline, MA (US); Abhishek Murthy, Arlington, MA (US); Jin Yu, Lexington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 411 days.

(21) Appl. No.: 17/299,410

(22) PCT Filed: Jan. 9, 2020

(86) PCT No.: PCT/EP2020/050348
§ 371 (c)(1),
(2) Date: Jun. 3, 2021

(87) PCT Pub. No.: WO2020/144245
PCT Pub. Date: Jul. 16, 2020

(65) Prior Publication Data
US 2022/0057503 A1    Feb. 24, 2022

Related U.S. Application Data

(60) Provisional application No. 62/790,039, filed on Jan. 9, 2019.

(30) Foreign Application Priority Data

Feb. 12, 2019 (EP) .................................... 19156567

(51) Int. Cl.
*G01S 13/66* (2006.01)
*F21V 23/04* (2006.01)
(Continued)

(52) U.S. Cl.
CPC .......... *G01S 13/66* (2013.01); *F21V 23/0471* (2013.01); *G01S 13/86* (2013.01); *G01S 13/87* (2013.01)

(58) Field of Classification Search
None
See application file for complete search history.

(56) References Cited

U.S. PATENT DOCUMENTS

| 2017/0301220 A1 | 10/2017 | Jarrell et al. |
| 2018/0292214 A1 | 10/2018 | Zhang |
| 2019/0018130 A1* | 1/2019 | Griggs .................... G01S 13/87 |

FOREIGN PATENT DOCUMENTS

| CN | 105607645 A | 5/2016 |
| CN | 107065925 A | 8/2017 |

(Continued)

*Primary Examiner* — Bernarr E Gregory

(57) ABSTRACT

The present disclosure is directed to inventive systems, methods, and devices for use in an outdoor lighting network for drone detection. The drone detection system includes one or more lighting fixtures, one or more radar sensors to detect a moving object, and one or more controllers. The controllers receive data from the sensors, determine the velocity and velocity change rate of the object over a period of time, and analyze flight data pertaining to the moving object to determine if the object is a drone. The system can determine the starting location of the moving object, and send a signal indicating its starting location. The system can also track the position of the moving object in the outside environment.

14 Claims, 5 Drawing Sheets

(51) Int. Cl.
*G01S 13/86* (2006.01)
*G01S 13/87* (2006.01)
*G01S 13/00* (2006.01)

(56) References Cited

FOREIGN PATENT DOCUMENTS

| CN | 107202581 A | 9/2017 | |
|----|----|----|----|
| CN | 107831776 A | 3/2018 | |
| WO | WO2012/023087 A1 * | 2/2012 | ............. G01S 13/56 |
| WO | 2018189744 A1 | 10/2018 | |

* cited by examiner

SYSTEMS, METHODS, AND DEVICES FOR DRONE DETECTION USING AN OUTDOOR LIGHTING NETWORK

CROSS-REFERENCE TO PRIOR APPLICATIONS

This application is the U.S. National Phase application under 35 U.S.C. § 371 of International Application No. PCT/EP2020/050348, filed on Jan. 9, 2020, which claims the benefit of U.S. Provisional Patent Application No. 62/790,039, filed on Jan. 9, 2019 and European Patent Application No. 19156567.0, filed on Feb. 12, 2019. These applications are hereby incorporated by reference herein.

FIELD OF THE INVENTION

The present disclosure is directed to systems, methods, and devices for detecting drones using an outdoor lighting network.

BACKGROUND

As consumer-grade drones have become popular around the world, they are presenting both unique and frequent threats to privacy, physical security, and public safety in a wide variety of physical environments, including industrial and critical infrastructure, prisons, government facilities, airports, outdoor events and venues, military, homeland security, border control, real assets, and executive protection.

Current drone detection methods rely on human eyes or commercial detection systems. Although manually detecting a drone by a human eye can achieve high accuracy, human eyes have very limited detection ranges, and are especially hindered in environments where there are obstacles blocking the view of the drone. Commercial drone detection systems such as DroneSentinel or Aaronia AARTOS DDS have reasonably high real-time detection accuracy, but these systems are too expensive to be deployed with such density that can cover a large area such as an entire city. Install and providing power to these commercial drone detection systems would require great time and costs. Also, these systems are easily exposed and vulnerable to attack or loss of function.

Accordingly, there is a continued need in the art for systems and methods that improve drone detection.

SUMMARY OF THE INVENTION

The present disclosure is directed to inventive systems, methods, and devices for drone detection in an outdoor lighting network with radar sensors. In particular, embodiments of the present invention are directed to improved detection of drones in an outdoor environment quickly and accurately. Various embodiments and implementations herein are directed to a drone detection system including a lighting network including one or more lighting fixtures, one or more radar sensors, and one or more controllers.

Generally, in one aspect, a drone detection system using an outdoor lighting network is provided. The drone detection system includes: (i) one or more lighting fixtures; (ii) one or more radar sensors configured to detect a moving object in an outside environment; and (iii) one or more controllers. The controllers are configured to: receive data from one or more sensors; determine the velocity and velocity change rate of the object over a period of time; analyze flight data pertaining to the moving object to determine the starting location of the moving object; and send a signal indicating the starting location of the moving object.

According to an embodiment, the system is further configured to include a plurality of radar modules installed in one lighting fixture to achieve radar sensing coverage in substantially all directions around the lighting fixture.

According to an embodiment, the lighting network is further configured to provide for data about a moving object to be sent and received among a plurality of lighting fixtures.

According to an embodiment, the lighting network is further configured to provide for data about a moving object to be sent and received between the plurality of lighting fixtures and a control center.

Generally, in one aspect, a lighting fixture for drone detection is provided. The lighting fixture includes one or more radar sensors configured to detect a moving object in an outside environment and one or more controllers. The controllers are configured to receive data from one or more sensors; determine the velocity and velocity change rate of the object over a period of time; analyze flight data pertaining to the moving object to determine the starting location of the moving object; and send a signal indicating the starting location of the moving object.

Generally, in one aspect, a method for drone detection using an outdoor lighting network is provided. The method includes (i) detecting, by one or more radar sensors in the outdoor lighting network, a moving object in an outside environment; (ii) monitoring, by the one or more radar sensors in the outdoor lighting network, the moving object's velocity or velocity change rate over a period of time; (iii) determining, by the one or more radar sensors in the outdoor lighting network, if the moving object is a drone based on the monitored velocity or velocity change rate of the moving object; and if the moving object is determined to be a drone; (iv) analyzing, by the outdoor lighting network, flight data pertaining to the moving object to determine a starting location of the moving object; and (v) sending, by the outdoor lighting network, a signal indicating the starting location of the moving object.

According to an embodiment, the method further includes the step of tracking, by the outdoor lighting network, the position of the moving object in the outside environment.

According to an embodiment, the method further includes the step of storing the moving object's monitored velocity or velocity change rate over a period of time.

According to an embodiment, the method further provides for the moving object to be determined to be a drone if velocity or velocity change rate is substantially constant.

According to an embodiment, the method further includes the step of determining, by the one or more radar sensors in the outdoor lighting network, if the moving object is a drone based on whether the object moves in one or more substantially straight lines.

According to an embodiment, the method further provides for one or more radar sensors to include Doppler radar sensors or ultra wide band radar sensors or frequency modulated continuous wave radar.

According to an embodiment, the method further provides for a plurality of radar modules to be installed in one lighting fixture to achieve radar sensing coverage in substantially all directions around the lighting fixture.

According to an embodiment, the method further includes the step of providing for data about a moving object to be sent and received among a plurality of lighting fixtures and/or a control center.

According to an embodiment, the method further provides for the flight data to include a tracking identification, flying velocity, velocity change rate, position, time, peak flying velocity, flying direction, or a transition matrix.

According to an embodiment, the method further includes the step of cross-checking the flight data obtained by one or more radar sensors with the flight data of one or more objects detected by neighboring radar sensors.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of systems, methods, and lighting fixtures for detecting drones in an outdoor environment. More generally, Applicant has recognized and appreciated that it would be beneficial to configure an outdoor lighting network to distinguish drones from other flying objects, such as birds, using a network of radar sensors on lighting fixtures, and also trace the detected drone to its starting point. Exemplary goals of utilization of certain embodiments of the present disclosure are to provide low cost, high density detection networks which have high accuracy and reliability.

In view of the foregoing, various embodiments and implementations are directed to an outdoor lighting system comprising one or more lighting fixtures, one or more radar sensors, and one or more controllers configured to detect drones.

Figure 1:
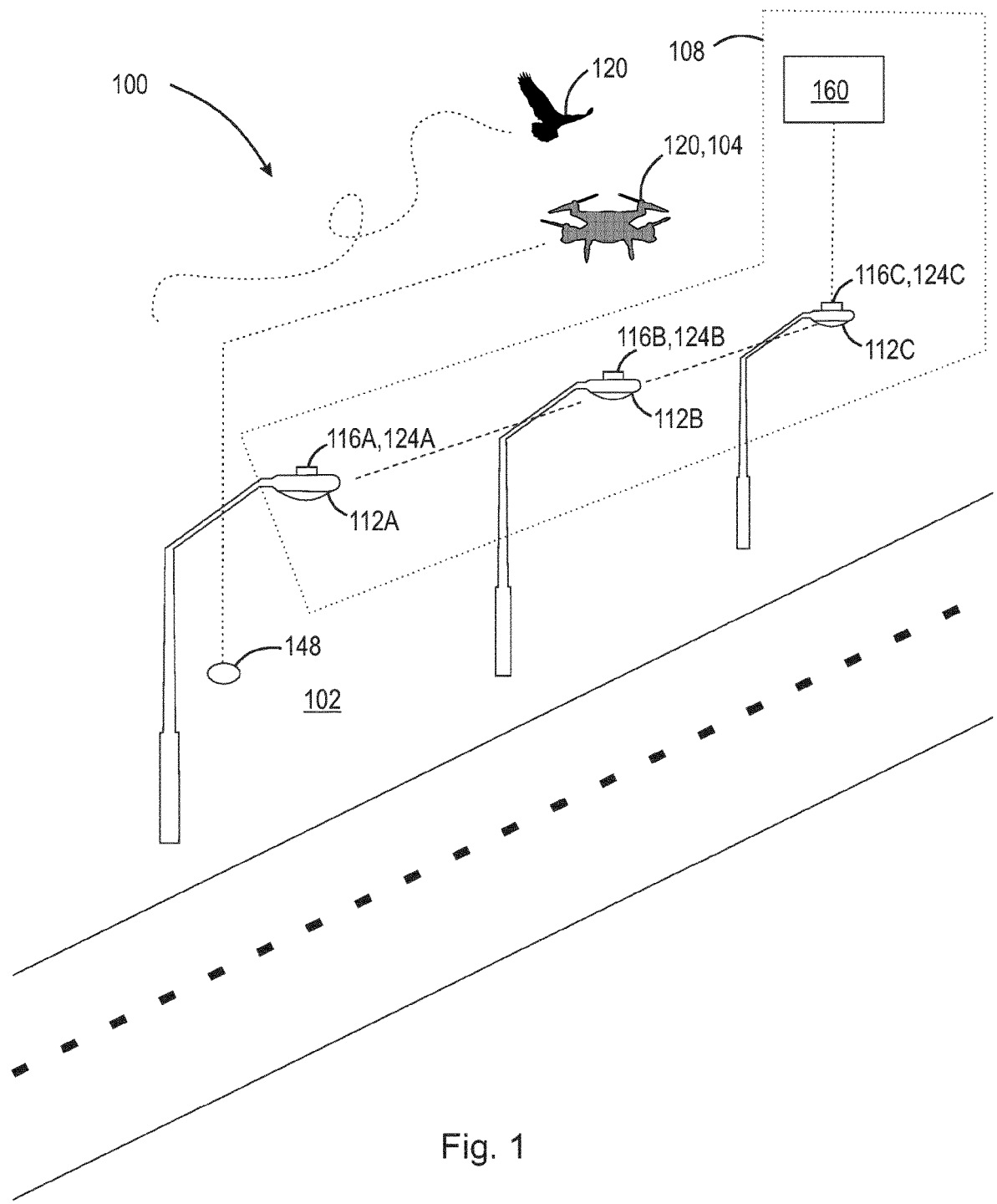
FIG. 1 is a graphic illustrating a drone detection system in an outdoor environment according to aspects of the present disclosure.

Referring to FIG. 1, a drone detection system 100 according to one embodiment is shown for an outdoor environment 102. In this example, a lighting network 108 includes a plurality of lighting fixtures 112A, 112B, 112C. It is noted that individual ones of the lighting fixtures 112 may include an alphabetic suffix (e.g., A, B, C, etc.) appended to the numeral '112' in order to facilitate discussion with respect to certain ones of the lighting fixtures 112, however, it is to be understood that reference to the "lighting fixtures 112" is generally applicable to all of the lighting fixtures 112 regardless of alphabetic suffix, unless otherwise noted. The lighting network 108 also includes a plurality of radar sensors 116A, 116B, 116C. It is noted that individual ones of the radar sensors 116 may include an alphabetic suffix (e.g., A, B, C, etc.) appended to the numeral '116' in order to facilitate discussion with respect to certain ones of the radar sensors 116, however, it is to be understood that reference to the "radar sensors 116" is generally applicable to all of the radar sensors 116 regardless of alphabetic suffix, unless otherwise noted.

In the illustrated example of FIG. 1, each lighting fixture 112A, 112B, 112C has a radar sensor 116A, 116B, 116C adjacent to it. In another example, as further described in FIG. 2, multiple radar modules 176 can be positioned on a lighting unit 112. In the example illustrated in FIG. 1, the lighting network 108 also includes three controllers 124A, 124B, 124C each interconnected in a manner to facilitate the transport of information with one or more of the radar sensors 116A, 116B, 116C. It is noted that individual ones of the controllers 124 may include an alphabetic suffix (e.g., A, B, C, etc.) appended to the numeral '124' in order to facilitate discussion with respect to certain ones of the controllers 124, however, it is to be understood that reference to the "controllers 124" is generally applicable to all of the controllers 124 regardless of alphabetic suffix, unless otherwise noted.

Figure 3:
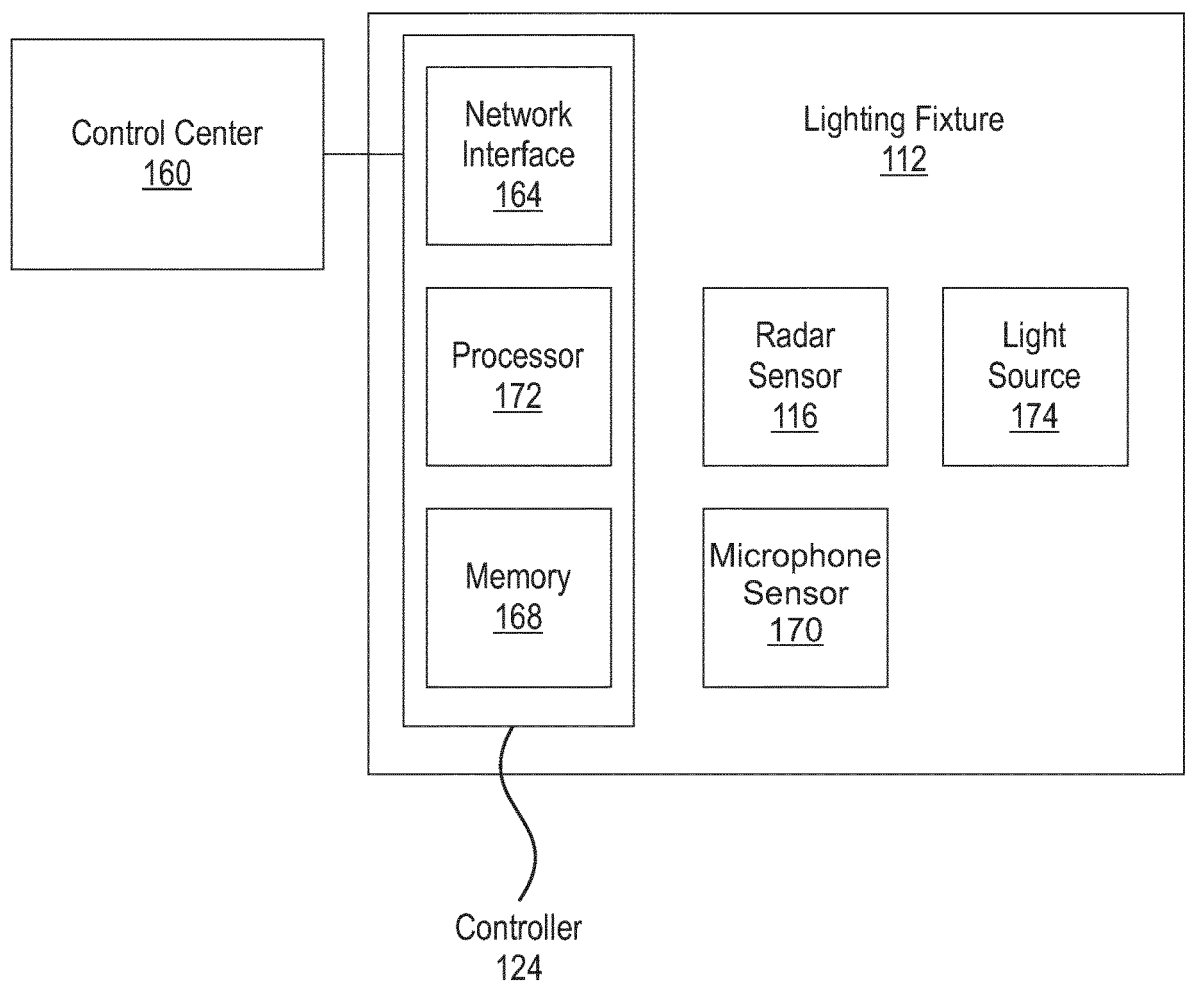
FIG. 3 is a schematic illustration of a lighting fixture which may form part of the outdoor lighting network according to aspects of the present disclosure.

In an alternative example illustrated in FIG. 3, the radar sensor 116 and the controller 124 are located within the lighting fixture 112. A microphone sensor 170 may also be located within the lighting fixture 112. Referring back to FIG. 1, the lighting network 108 can also include a control center 160 which can be connected via wire/cable and/or fiber optic links or wireless connection to the controllers 124A, 124B, 124C.

The terms "lighting unit" and "lighting fixture" are interchangeably used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

Referring to FIG. 1, the radar sensors 116A, 116B, 116C are arranged to detect a moving object 120 in the outside environment 102. In this example, each of the radar sensors 116A, 116B, 116C are interconnected in a manner that facilitates the transport of information with controllers 124A, 124B, 124C, which receive data from the radar sensors 116A, 116B, 116C. The data may include information relating to the velocity and velocity change rate over a period of time of the detected moving object 120 and can also include tracking identification, flying velocity, velocity change rate, position, time, peak flying velocity, flying direction, flying direction change rate, sound data, such as a spectrogram, or a transition matrix. The transition matrix may be a probability matrix regarding how likely the detected object is a drone. The controllers 124A, 124B, 124C can analyze data associated with the moving object 120 to determine if the moving object 120 is a drone 104. Additionally, the controllers 124A, 124B, 124C can analyze data associated with the moving object to determine the starting location of the drone 104 and send a signal indicating the starting location 148 of the drone 104. Each controller 124A, 124B, 124C can analyze data associated with the moving object 120 independently, in conjunction with other controllers 124, or in conjunction with a control center 160.

In an illustrated example, the controller 124 allows for data about a moving object 120 (shown in FIG. 1) to be sent and received among the lighting fixtures 112A, 112B, 112C. In the illustrated embodiment, the controller 124 also allows for data about a moving object 120 (shown in FIG. 1) to be sent to and received from a control center 160. The control center 160 can further analyze the data analyzed and obtained by any or all of the individual controllers 124.

In one example, the radar sensors 116 used in the lighting network 108 can include Doppler radars. Doppler radar motion sensors use changes in transmitting frequency to determine if an object is in their path. Optionally, the radar sensors 116 used in the lighting network 108 can include ultra wide band (UWB) radar. UWB radar systems transmit signals across a much wider frequency than conventional radar systems and are usually difficult to detect. In another example, the radar sensors 116 can include frequency modulated continuous wave radar.

Figure 2:
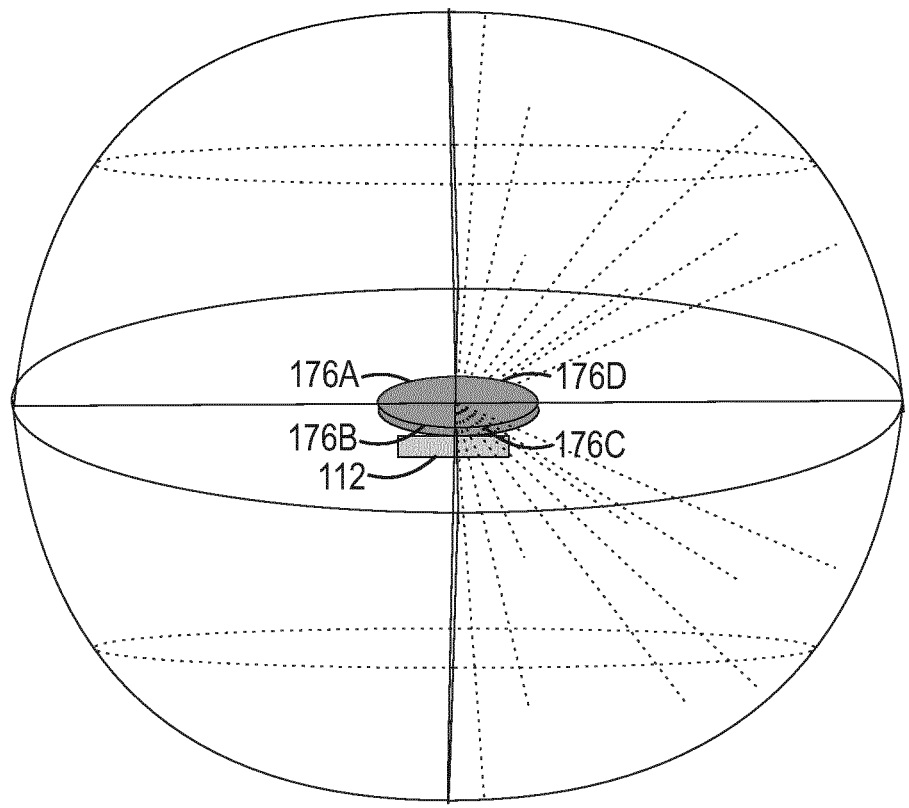
FIG. 2 is an illustration showing multiple radar modules on one lighting fixture according to aspects of the present disclosure.

One embodiment showing a lighting fixture 112 having multiple radar modules 176A, 176B, 176C, and 176D is illustrated in FIG. 2. A radar module is a radar sensor that can be inserted in or on one lighting fixture. Alternatively, the radar module may include other sensors, such as a microphone sensor 170, which can be used to detect an object by its noise. The microphone sensor data can be used as another feature to detect and increase the accuracy of detection of a drone. In the illustrated example, one lighting fixture 112 has four radar modules 176A, 176B, 176C, and 176D positioned around the lighting fixture 112. The radar modules 176A, 176B, 176C, 176D are oriented in a manner that they can sense moving objects 120 (shown in FIG. 1) in substantially all directions around the lighting fixture, indicated by the three-dimensional sphere around the lighting fixture. With four radar modules 176A, 176B, 176C, 176D, each radar sensor 116 can sense moving objects 120 (shown in FIG. 1) in roughly one fourth of the area that is shown by the sphere. The area in which each radar module 176A, 176B, 176C, 176D can detect moving objects 120 (shown in FIG. 1), sensing coverage area, could also overlap with the area in which radar modules 176A, 176B, 176C, 176D adjacent to it can sense objects. The sensing coverage area of any of the illustrated radar modules 176A, 176B, 176C, 176D can also overlap with the sensing coverage area of neighboring radar modules 176 or radar sensors 116 in or on other lighting fixtures 112 not illustrated in this figure.

The basic components of a lighting fixture 112 according to one example are shown in FIG. 3. In this example, the lighting fixture 112 includes a light source 174, a radar sensor 116, and a controller 124. The controller 124 is arranged with suitable components for controlling, monitoring, and/or otherwise assisting in the operation of the light source 174 and the radar sensor 116, including analyzing data from the radar sensor 116 related to detection of a moving object 120 (shown in FIG. 1). In the illustrated example, the controller 124 includes a memory 168, a processor 172, and a network interface 164. The memory 168 and the processor 172 may take any suitable form known in their respective arts that is useful for controlling, monitoring, and/or otherwise assisting in the operation of the light source 174 and the radar sensor 116, including analyzing data from the radar sensor 116. It is to be understood that the controller 124 is shown schematically in FIG. 3 and may include any other components useful for controlling, monitoring, and/or otherwise assisting in the operation of the light source 174 and the radar sensor 116, including analyzing data related to detection of a moving object 120 (shown in FIG. 1) from the radar sensor 116. The network interface 164 may be a wireless transceiver or any other device that enables the lighting fixtures 112 to communicate wirelessly with each other as well as other devices utilizing the same wireless protocol standard and/or to otherwise monitor network activity. The network interface 164 may also use wire/cable and/or fiber optic links.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Additionally, a light source may include as an integral component one or more filters (e.g., color filters), lenses, or other optical components. Also, it should be understood that light sources may be configured for a variety of applications, including, but not limited to, indication, display, and/or illumination.

Figure 4:
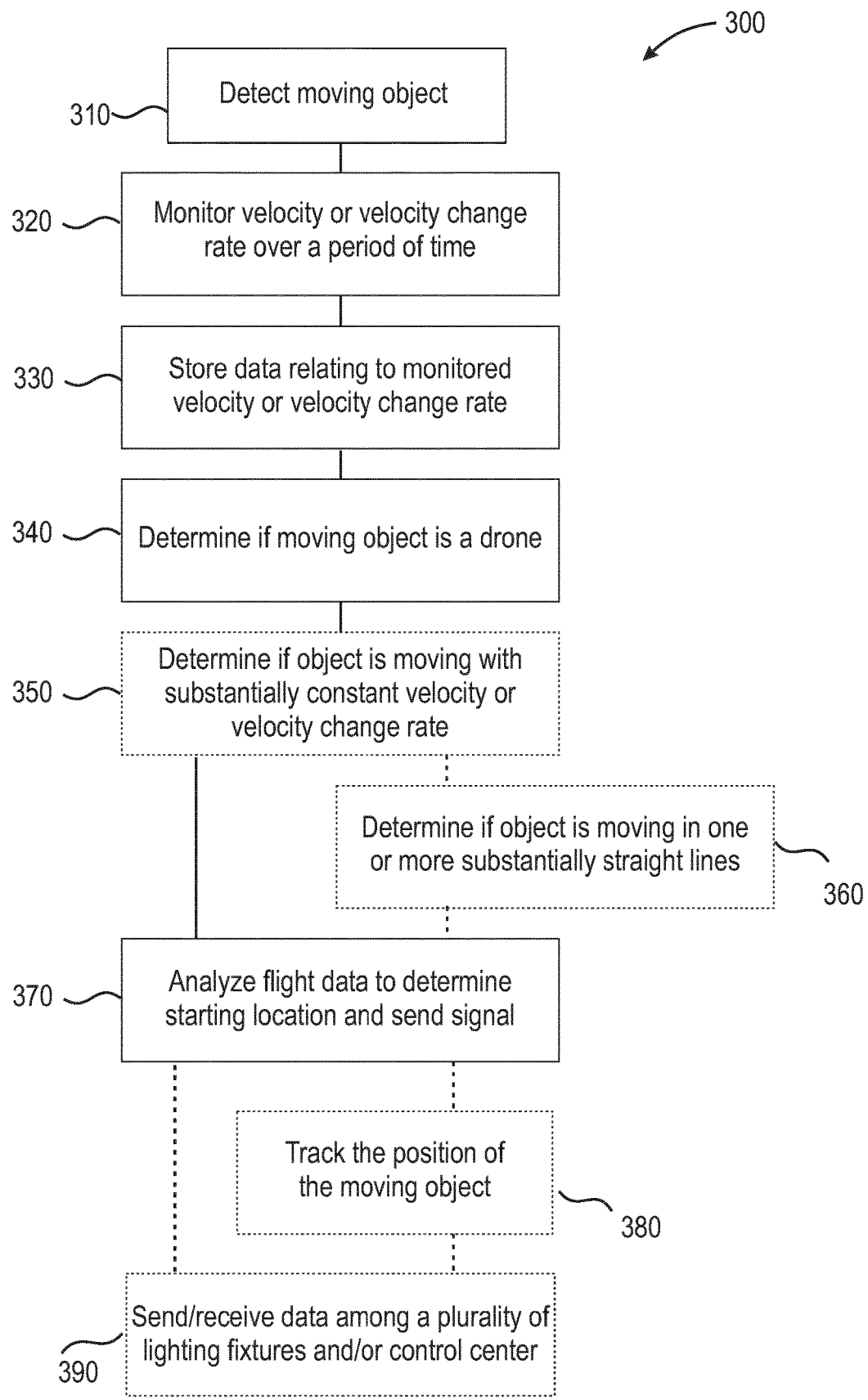
FIG. 4 is flow chart showing operation of a system for drone detection according to aspects of the present disclosure.

To better understand the various embodiments disclosed herein, FIG. 4 is provided which includes a flowchart that depicts a method 300 to detect a drone 104 according to one example. Starting at step 310, a moving object 120 is detected in an outside environment 102 by the outdoor lighting network 108. At step 320, the velocity of the moving object 120 is monitored over a period of time or the velocity change rate of the moving object 120 is monitored over a period of time. The data relating to velocity or velocity change rate of the moving object 120 is stored at step 330. As depicted in FIG. 1, data relating to the moving object's 120 velocity or velocity change rate can be stored by the lighting network 108 in a controller 124 or a control center 160. The radar sensors 116, controllers 124, and/or control center 160 are part of the lighting network 108 and interconnected in a manner to facilitate the transport of information. As illustrated in FIG. 1, the data gathered from one radar sensor 116A can be stored or analyzed by controller 124A or by controllers 124B or controller 124C, which are not physically adjacent to radar sensor 116A. The data gathered from radar sensor 116A can also be stored or analyzed by the control center 160.

Referring to FIG. 4, at step 340, the network is used to determine whether the moving object is a drone. At step 350 the outdoor lighting network can be used to determine if the object is a drone based on whether the object is moving with substantially constant velocity or velocity change rate. At optional step 360 the outdoor lighting network can be used to determine if the object is a drone based on whether the object is moving in one or more substantially straight lines. An object moving at a substantially constant velocity or velocity change rate or in one or more substantially straight lines can be determined by data processing techniques known in the art using data regarding objects tracked in the lighting network 108. It is also to be appreciated that the network 108 may be equipped with algorithms related to artificial intelligence, machine learning, artificial neural networks, etc. in order to enable advanced decision making analytics and determination based on the collected data. In one example, one or more algorithms may be utilized (e.g., by the controllers 124 and/or the control center 160) to process the data collected by the sensors 116 to attempt to make a higher level determination or probabilistic guess as to whether an object's velocity, velocity change rate, or flying trajectory corresponds to that of a drone.

Referring to FIG. 4, at step 370 flight data is analyzed to determine start location of the drone. This can be done at optional step 390 by sending and receiving data between the plurality of lighting fixtures 112 or by sending and receiving data between the plurality of lighting fixtures 112 and the control center 160. At optional step 380 the outdoor lighting network is used to track the position of the moving object in the outside environment. This can be done at optional step 390 by sending and receiving data between the plurality of lighting fixtures 112 or by sending and receiving data between the plurality of lighting fixtures 112 and the control center 160. Information about the flight path of a moving object as it moves from the sensing coverage area of one radar 116 to another can be analyzed to ascertain the identity of the moving object and its trajectory across different radar sensing coverage areas. Cross-checking data with neighboring lighting fixtures can increase the accuracy of data pertaining to the velocity or velocity change rate over a period of time of the moving object 120 and reduce noise in the system. Cross-checking may involve the use of known algorithms for location detection and/or triangularization. Cross-checking can be done at a variety of points along the method 300 of drone detection illustrated in FIG. 4, including but not limited to detection of the moving object 310, monitoring the object's velocity or velocity change rate over a period of time 320, determining if the moving object is a drone 340 and analyzing the flight data to determine a starting location 370.

As illustrated in FIG. 1, at the time a moving object 120 is initially detected, the moving object 120 can be detected by a single radar sensor 116, or it can be detected by multiple radar sensors 116 that have overlapping sensing coverage areas. Over the period of time monitored, the moving object 120 can be monitored by one radar sensor 116 which has sensing coverage over the entire area in which the moving object moved over the period monitored. Conversely, over the period of time monitored, the moving object 120 can be monitored by two or more radar sensors 116 which have combined sensing coverage areas (completely overlapping, partially overlapping, or not overlapping) over the entire area in which the moving object moved over the period monitored.

The interconnected lighting network 108 allows for rapid access of data, especially where data is stored in controllers 124 in wireless connection with each other or in proximity to each other on nearby lighting fixtures 112. Rapid access to and storage of data allows for information about the movement of an object to be shared among the controllers 124, and especially among radar sensors 116 with sensing coverage areas adjacent to each other. In this manner, as the moving object 120 moves from the sensing coverage area of one radar 116 to another radar 116, information can be shared between the radar's controllers which aids in the accuracy of the identification and detection of the moving object, the monitoring of the moving objects velocity or velocity change rate over a period of time, and the determination of whether the moving object is a drone.

Figure 5:
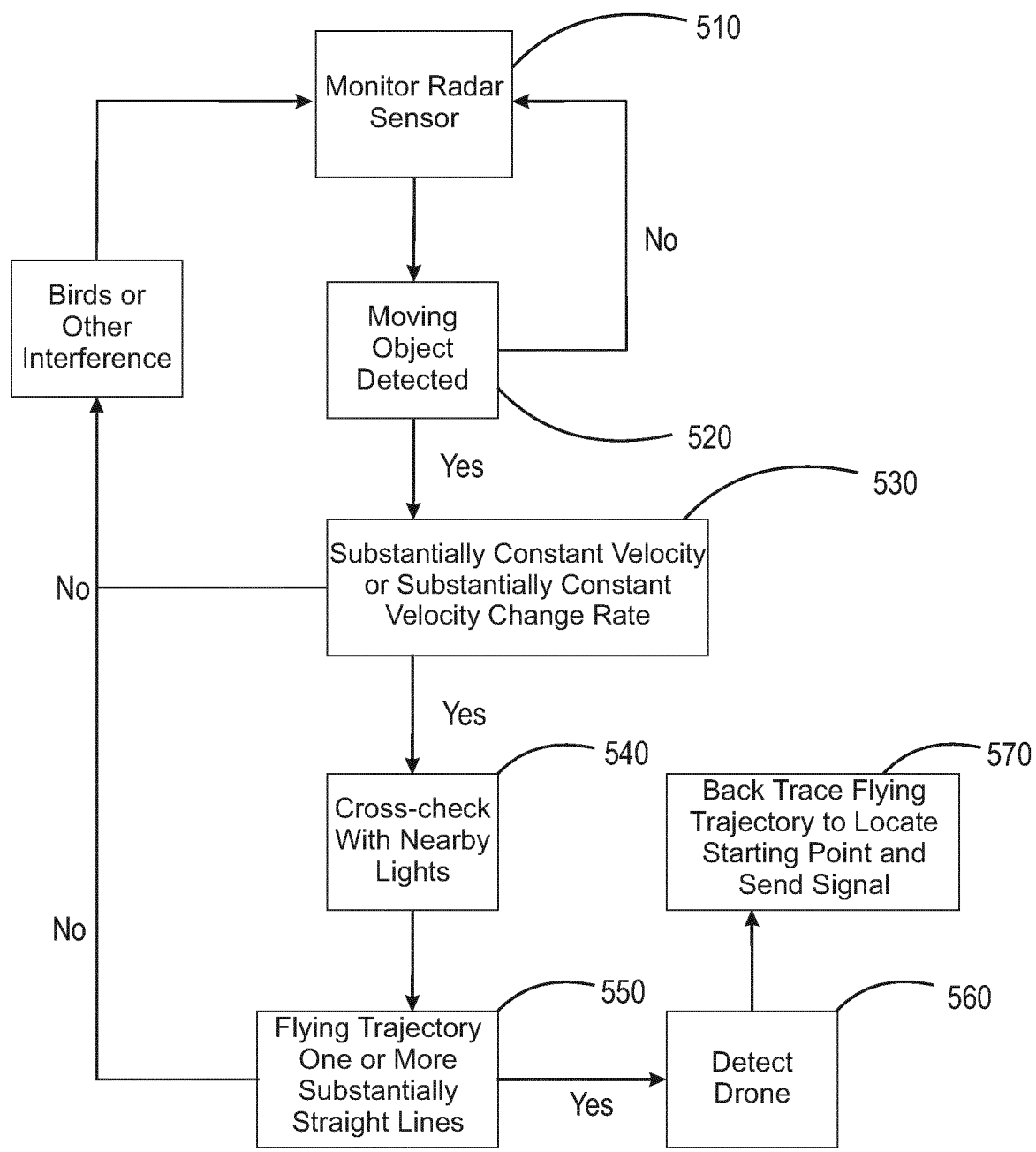
FIG. 5 is a flow chart showing operation of a system for drone detection according to aspects of the present disclosure.

FIG. 5 is a flow chart illustrating another example method for the detection of drones 104 using an outdoor lighting network. At step 510, radar sensors are used to monitor the outdoor environment. If a moving object is detected at step 520, then at step 530 the outdoor lighting network is used to determine if the moving object is moving with substantially constant velocity or substantially constant velocity change rate. If the moving object is not moving with substantially constant velocity or substantially constant velocity change rate, then the moving object may be another type of flying object, such as a bird, or other interference. If the object is moving with substantially constant velocity or substantially constant velocity change rate, then lighting network 108 will cross check with nearby lights at step 540 to determine if the moving object's flying trajectory is composed of one or more substantially straight lines at step 550. The system can make a determination that the moving object is a drone if the flying trajectory is composed of one or more substantially straight lines at step 560. If the moving object's flying trajectory is not composed of one or more substantially straight lines, then the object may be another type of flying object such as a bird or other interference. At step 570, data about the drone's 104 flight path will be used to trace the drone's flying trajectory across the sensor coverage areas of one or more radar sensors 116 to locate the drone's starting point. Also at step 570, a signal is sent to indicate the starting location of the moving object.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A method for drone detection using an outdoor lighting network, the method comprising the steps of:
    detecting, by one or more radar sensors in the outdoor lighting network, a moving object in an outside environment;
    monitoring, by the one or more radar sensors in the outdoor lighting network, the moving object's velocity or velocity change rate over a period of time;
    determining, by the one or more radar sensors in the outdoor lighting network, if the moving object is a drone based on the monitored velocity or velocity change rate of the moving object, the moving object being determined to be a drone if the monitored velocity or velocity change rate is substantially constant; and
    if the moving object is determined to be a drone:
        analyzing, by the outdoor lighting network, flight data pertaining to the drone to determine a starting location of the drone; and sending, by the outdoor lighting network, a signal indicating the starting location of the drone.

2. The method of claim 1, further comprising the step of tracking, by the outdoor lighting network, the position of the moving object in the outside environment.

3. The method of claim 1, further comprising the step of storing the moving object's monitored velocity or velocity change rate over a period of time.

4. The method of claim 1, further comprising the step of determining, by the one or more radar sensors in the outdoor lighting network, if the moving object is a drone based on whether the object moves in one or more substantially straight lines.

5. The method of claim 1, wherein the one or more radar sensors include Doppler radar sensors or ultra wide band radar sensors or frequency modulated continuous wave radar.

6. The method of claim 1, wherein a plurality of radar modules are installed in one lighting fixture to achieve radar sensing coverage in substantially all directions around the lighting fixture.

7. The method of claim 1, further comprising the step of providing for data about a moving object to be sent and received among a plurality of lighting fixtures and/or a control center.

8. The method of claim 1, wherein the flight data includes a tracking identification, flying velocity, velocity change rate, position, time, peak flying velocity, flying direction, flying direction change rate, sound data, or a transition matrix.

9. The method of claim 1, further comprising the step of cross-checking the flight data obtained by one or more radar sensors with the flight data of one or more objects detected by neighboring radar sensors.

10. A system for drone detection using an outdoor lighting network, comprising:
    one or more lighting fixtures;
    one or more radar sensors configured to detect a moving object in an outside environment;
    one or more controllers configured to:
    receive data from one or more sensors;
    determine the velocity and velocity change rate of the object over a period of time;
    determine, by the one or more radar sensors in the outdoor lighting network, if the moving object is a drone based on the monitored velocity or velocity change rate of the moving object, the moving object being determined to be a drone if the monitored velocity or velocity change rate is substantially constant;
    if the moving object is determined to be a drone:
        analyze flight data pertaining to the drone to determine the starting location of the drone;
        send a signal indicating the starting location of the drone.

11. The system of claim 10, wherein a plurality of radar modules are installed in one lighting fixture to achieve radar sensing coverage in substantially all directions around the lighting fixture.

12. The system of claim 10, wherein the lighting network provides for data about a moving object to be sent and received among a plurality of lighting fixtures.

13. The system of claim 10, wherein the lighting network provides for data about a moving object to be sent and received between the plurality of lighting fixtures and a control center.

14. A lighting fixture for drone detection in an outdoor lighting network, comprising:
- one or more radar sensors configured to detect a moving object in an outside environment;
- one or more controllers configured to:
- receive data from one or more sensors;
- determine the velocity and velocity change rate of the object over a period of time;
- determine, by the one or more radar sensors in the outdoor lighting network, if the moving object is a drone based on the monitored velocity or velocity change rate of the moving object, the moving object being determined to be a drone if the monitored velocity or velocity change rate is substantially constant;
- if the moving object is determined to be a drone:
  - analyze flight data pertaining to the drone to determine the starting location of the drone; and
  - send a signal indicating the starting location of the drone.

* * * * *